US012647781B2

(12) United States Patent
Swaminathan et al.

(10) Patent No.: US 12,647,781 B2
(45) Date of Patent: Jun. 2, 2026

(54) TERMINAL HANDLER FOR PROVIDING REMOTE ACCESS TO SERVICE DEVICES TO FACILITATE SECURE TRANSACTIONS

(71) Applicant: Truist Bank, Charlotte, NC (US)

(72) Inventors: Sudhakar Swaminathan, Duluth, GA (US); Muthu Gopalakrishnan, Suwanee, GA (US); Ryan Loesch, Cumming, GA (US)

(73) Assignee: Truist Bank, Charlotte, NC (US)

( * ) Notice: Subject to any disclaimer, the term of this patent is extended or adjusted under 35 U.S.C. 154(b) by 309 days.

(21) Appl. No.: 18/364,509

(22) Filed: Aug. 3, 2023

(65) Prior Publication Data

US 2025/0048093 A1     Feb. 6, 2025

(51) Int. Cl.
*H04W 12/06* (2021.01)
*H04W 12/63* (2021.01)

(52) U.S. Cl.
CPC ........... *H04W 12/06* (2013.01); *H04W 12/63* (2021.01)

(58) Field of Classification Search
CPC ..... H04W 4/70; H04W 12/06; H04W 12/069; H04W 84/12; H04W 12/08; H04W 4/80; H04W 24/08; H04W 4/029; H04W 12/03; H04W 4/38; H04W 4/08; H04W 4/46; H04W 4/44; H04W 52/0258; H04W 64/003; H04W 84/005; H04W 92/045; H04W 8/18; H04W 12/108; H04W 8/20; H04W 8/04; H04W 28/0226; H04W 12/0431; H04W 36/22
See application file for complete search history.

(56) References Cited

U.S. PATENT DOCUMENTS

| | | | |
|---|---|---|---|
| 2012/0166338 A1* | 6/2012 | Agnelli ................... | H04W 4/80 |
| | | | 705/44 |
| 2013/0219516 A1* | 8/2013 | Shimshoni .............. | H04L 63/08 |
| | | | 726/28 |
| 2014/0279546 A1* | 9/2014 | Poole ................... | G06Q 20/382 |
| | | | 705/44 |
| 2017/0041316 A1* | 2/2017 | Setchell ................ | H04W 12/50 |
| 2020/0120087 A1* | 4/2020 | Sreenivas ........... | H04L 63/0492 |

* cited by examiner

*Primary Examiner* — Kwasi Karikari
(74) *Attorney, Agent, or Firm* — Kilpatrick Townsend & Stockton LLP; Michael A. Springs, Esq.

(57) ABSTRACT

A terminal handler of a computing environment can provide remote access to Internet of Things (IoT) service devices positioned in a location associated with a service provider to facilitate secure transactions. The terminal handler can control a particular IoT service device by performing operations. The operations can include receiving a request to perform a function of the particular IoT service device. The request can include authentication credentials for a user account. The operations can include authenticating a user of a mobile device based on the authentication credentials. The operations can include authenticating the mobile device based on a distance between a location of the mobile device and the location associated with the service provider being less than a threshold distance. The operations can include transmitting an application programming interface (API) call to the IoT service device to cause the IoT service device to perform the function.

15 Claims, 7 Drawing Sheets

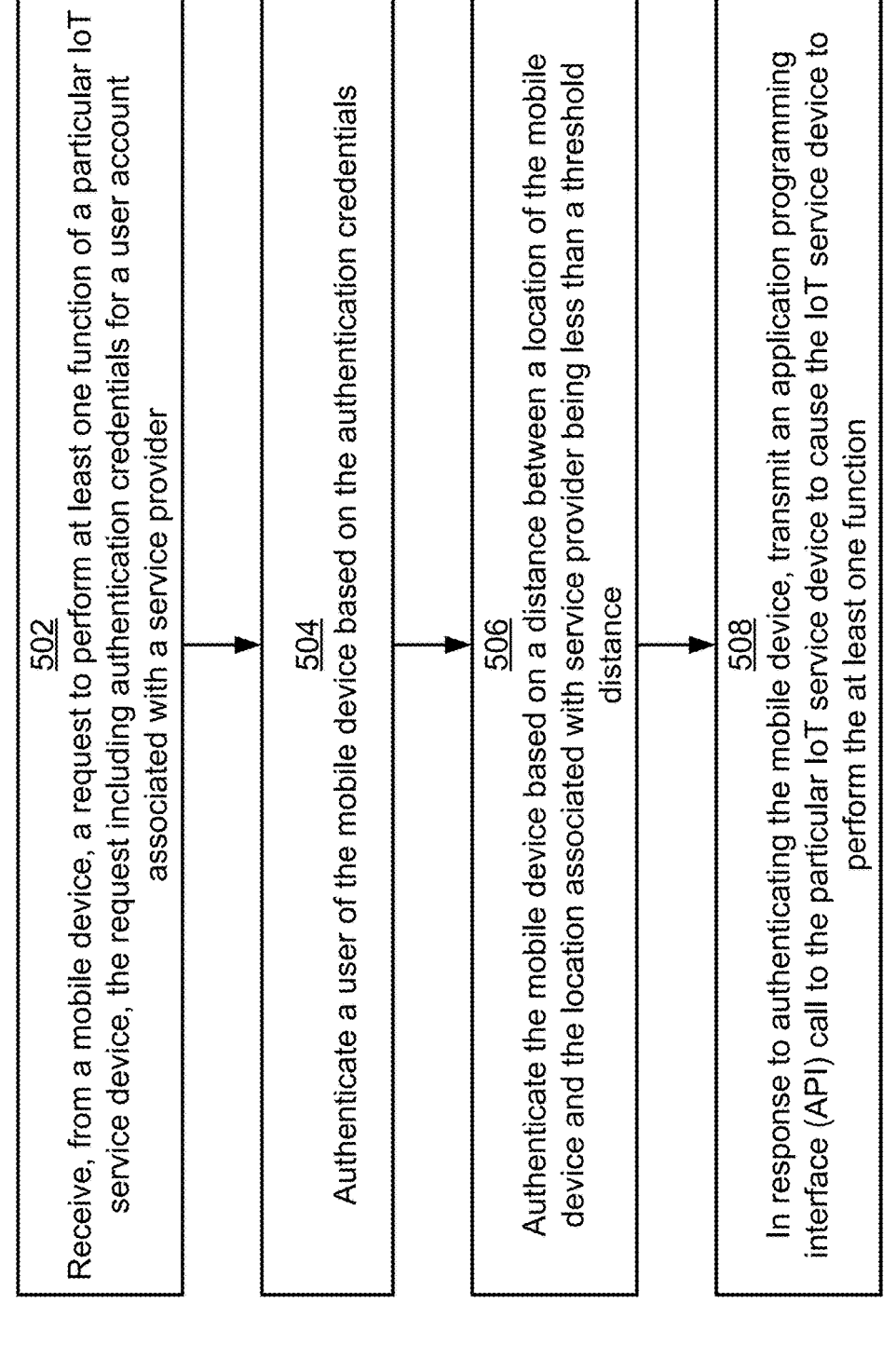

502
Receive, from a mobile device, a request to perform at least one function of a particular IoT service device, the request including authentication credentials for a user account associated with a service provider 504
Authenticate a user of the mobile device based on the authentication credentials 506
Authenticate the mobile device based on a distance between a location of the mobile device and the location associated with service provider being less than a threshold distance 508
In response to authenticating the mobile device, transmit an application programming interface (API) call to the particular IoT service device to cause the IoT service device to perform the at least one function

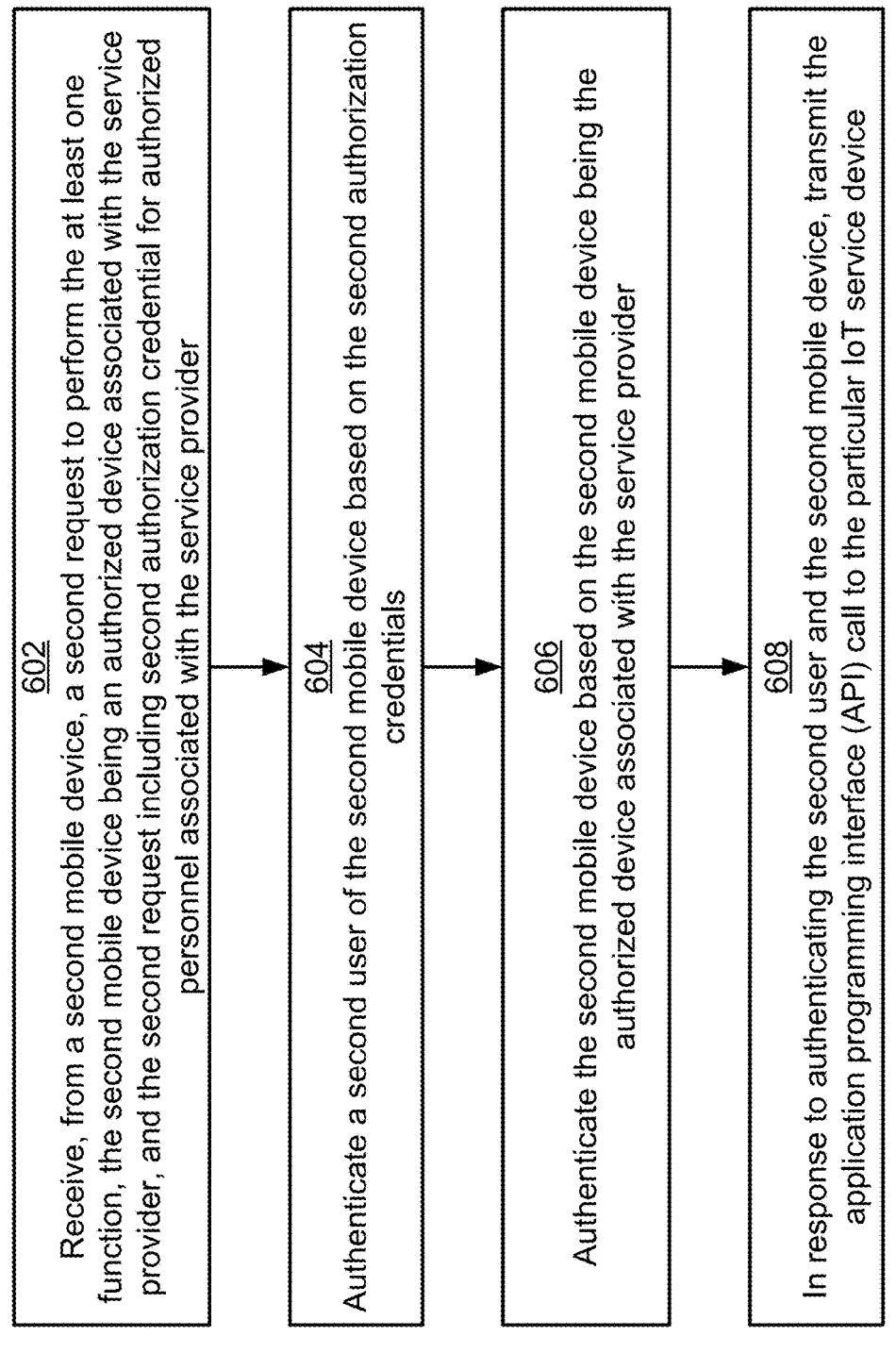

602

Receive, from a second mobile device, a second request to perform the at least one function, the second mobile device being an authorized device associated with the service provider, and the second request including second authorization credential for authorized personnel associated with the service provider

604

Authenticate a second user of the second mobile device based on the second authorization credentials

606

Authenticate the second mobile device based on the second mobile device being the authorized device associated with the service provider

608

In response to authenticating the second user and the second mobile device, transmit the application programming interface (API) call to the particular IoT service device

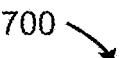
700

---

702
Receive a request to perform at least one function of a particular IoT service device

↓

704
Determine that the request satisfies at least one requirement for a step-up authentication protocol

↓

706
Transmit an authentication request for second authentication credentials to a mobile device

↓

708
Receive the second authentication credentials

↓

710
Authenticate a user of the mobile device based on the first authentication credentials and the second authentication credentials

↓

712
Transmit an application programming interface (API) call to the service device to cause the IoT service to perform the at least one function

FIG. 7

TERMINAL HANDLER FOR PROVIDING REMOTE ACCESS TO SERVICE DEVICES TO FACILITATE SECURE TRANSACTIONS

TECHNICAL FIELD

The present disclosure relates generally to secure transactions and, more particularly (although not necessarily exclusively), to a terminal handler that provides remote access to service devices to facilitate secure transactions between the service devices and user accounts.

BACKGROUND

A service provider can resolve service events for users at a location associated with the service provider. For example, a user can wait in a queue at the location to have a service event resolved by authorized personnel. However, waiting in the queue can be time-consuming. Thus, it can be desirable to automate the service events, such as by implementing service devices at the location associated with the service provider. The users can interact with the service devices, such as automated teller machines (ATMs), to cause the service devices to perform functions (e.g., the service events). For example, the users can interact with the ATMs to cause the ATMs to withdraw funds, deposit funds, or perform other suitable service events.

Additionally, there can be security concerns with automating the service events. Current service devices can require that users input pin numbers or access cards to authenticate with the service device prior to the user requesting that the service device perform service events. The pin numbers and access cards, however, may be stolen and may not be sufficient for authenticating the user. Therefore, there can be a need for improved security mechanisms for service devices.

SUMMARY

A terminal handler of a computing environment can provide remote access to Internet of things (IoT) service devices to facilitate secure transactions between the IoT service devices and user accounts. For example, a system described herein can include the terminal handler. The terminal handler can communicate with a plurality of IoT service devices positioned in a location associated with a service provider. The terminal handler can control a particular IoT service device by performing operations. The operations can include receiving, from a mobile device, a request to perform at least one function of the particular IoT service device. The request can include authentication credentials for a user account associated with the service provider. Additionally, the operations can include authenticating a user of the mobile device based on the authentication credentials. The operations can further include authenticating the mobile device based on a distance between a location of the mobile device and the location associated with the service provider being less than a threshold distance. In response to authenticating the user and the mobile device, the operations can further include transmitting an application programming interface (API) call to the particular IoT service device to cause the particular IoT service device to perform the at least one function. The at least one function can involve a secure transaction between the particular IoT service device and the user account.

In another example, a system described herein can include the terminal handler. The terminal handler can communicate with a plurality of IoT service devices positioned in a location associated with a service provider. The terminal handler can control the plurality of IoT service devices by performing operations. The operations can include receiving an access request from a mobile device. The access request can be transmitted in response to a user of the mobile device performing a contactless authentication process with a particular IoT service device of the plurality of IoT service devices. In response to receiving the access request, the operations can include identifying the particular IoT service device and identifying a user account associated with the mobile device and with the service provider. Subsequent to identifying the particular IoT service device and the user account, the operations can include providing access for the mobile device to at least one function of the particular IoT service device via a software application associated with the service provider, the at least one function usable to facilitate a secure transaction between the particular IoT service device and the user account.

In an example, a system described herein can include the terminal handler. The terminal handler can communicate with a plurality of IoT service devices positioned in a location associated with a service provider. The terminal handler can control a particular IoT service device by performing operations. The operations can include receiving, from a mobile device, a request to perform at least one function of the particular IoT service device. The request can include first authentication credentials for a user account associated with the service provider. The operations can further include determining that the request satisfies at least one requirement of a step-up authentication protocol. In response to determining that the request satisfies the at least one requirement, the operations can also include transmitting an authentication request for second authentication credentials to the mobile device. Additionally, the operations can include receiving, from the mobile device, the second authentication credentials. The operations can include authenticating a user of the mobile device based on the first authentication credentials and the second authentication credentials. In response to authenticating the user, the operations can include transmitting an application programming interface (API) call to the particular IoT service device to cause the particular IoT service device to perform the at least one function. The at least one function can involve a secure transaction between the particular IoT service device and the user account.

BRIEF DESCRIPTION OF THE DRAWINGS

FIG. 5 is a flow chart of a computer-implemented process for facilitating secure transactions between IoT service devices and user accounts by a terminal handler according to one example of the present disclosure.

FIG. 6 is a flow chart of an alternative computer-implemented process for facilitating secure transactions between IoT service devices and user accounts by a terminal handler according to one example of the present disclosure.

FIG. 7 is a flow chart of an additional alternative computer-implemented process for facilitating secure transactions between IoT service devices and user accounts by a terminal handler according to one example of the present disclosure.

DETAILED DESCRIPTION

Figure 1:
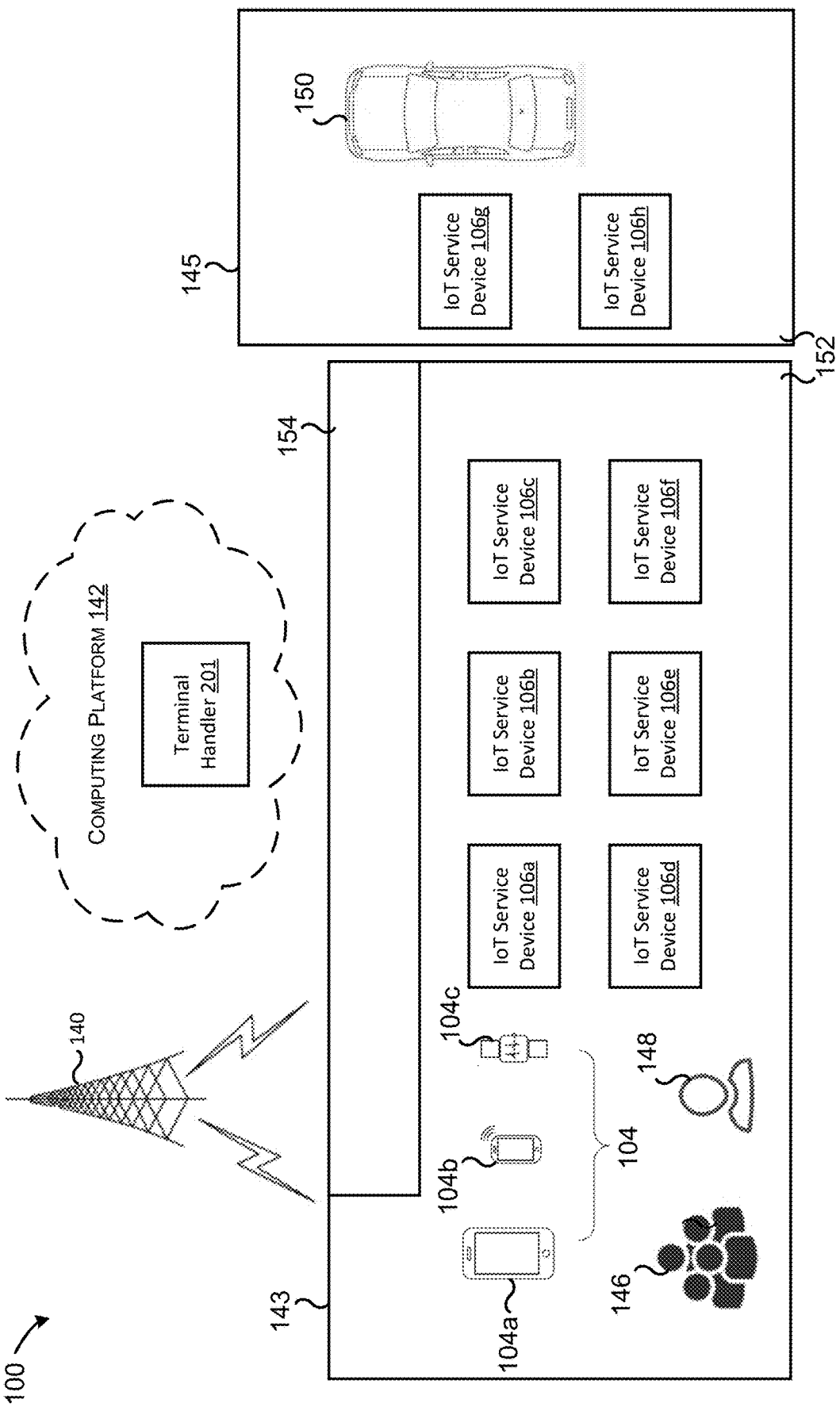
FIG. 1 is a schematic of an example of an IoT service device environment according to one example of the present disclosure.

Certain aspects and examples of the present disclosure relate to a terminal handler for providing remote access to service devices to facilitate secure transactions between the service devices and user accounts. In some examples, the service devices can be IoT service devices. Examples of service devices can include automated teller machines (ATMs), electronic funds transfer (EFT) terminals, teller cash recyclers (TCRs), check scanners, printers, or other suitable devices associated with a service provider (e.g., a financial institution). The IoT service devices can be service devices that are connected to the terminal handler via a network, such as a local area network (LAN) or the internet. The terminal handler can be a component of an IoT computing platform. The terminal handler can be in communication with the IoT service devices, mobile devices, other IoT devices, etc. via the network. For example, the terminal handler can receive requests to perform functions, receive requests for data, transmit data, or otherwise communicate with the IoT service devices, the mobile devices, the other IoT devices, etc. via the network.

The terminal handler can act as a central hub in a IoT service device environment, leveraging computing technology and algorithms to provide users with secure access to IoT service devices and facilitate service interactions with the IoT service devices. The terminal handler can interact with mobile devices of users and provide users with an intuitive interface that enables them to access and interact with the IoT service devices in a touchless manner. The terminal handler can be built with advancements in data encryption and protection protocols and safeguard user account data and confidentiality at all times. The terminal handler can be continuously updated to interact with new and updated IoT service devices, new and updated mobile devices, and to implement advancements in authentication protocols.

In some examples, the IoT service devices can be situated within a location associated with the service provider and the terminal handler can facilitate remote access between mobile devices and the IoT service devices. In particular, the remote access may be provided to mobile devices associated with a service provider. For example, the mobile devices can be authorized mobile devices, such as those belonging to employees or other suitable authorized personnel for the service provider. Additionally, the mobile devices can be registered with user accounts associated with the service provider or can be running a software application associated with the service provider.

To provide the remote access to the mobile devices, the terminal handler can perform authentication of the mobile devices. For example, the terminal handler can authenticate a mobile device on behalf of an IoT device. The terminal handler can be a software program, a computer processor, or an application programming interface (API) for managing interactions between the mobile devices and the IoT service devices. Additionally, in some examples, authenticating the mobile devices can include verifying that the mobile device is within a proximity of the IoT service device (e.g., within the location associated with the service provider), detecting that the mobile device is registered with the service provider, detecting that the mobile device is associated with a user account, or a combination thereof. Additionally or alternatively, the terminal handler can authenticate users of the mobile devices. For example, authenticating a user of the mobile device may include verifying that the user is associated with the user account, such as via authentication credentials, receiving an answer to a security question, etc.

Additionally, via the remote access, the mobile devices can transmit, to the terminal handler, requests for the IoT service devices to perform one or more functions. The functions can involve the IoT service device performing a service event (e.g., a secure transaction) with respect to a user account associated with the service provider. For example, the IoT service device can perform the secure transaction with the user account to transmit data to or from the user account, withdraw funds from the user account, etc. In some examples, the mobile devices may transmit the requests to the computing environment (e.g., an IoT computing platform, a computing cluster, etc.). In response, the terminal handler can transmit application programming interface (API) calls to the IoT service devices to cause the IoT service devices to perform the functions.

Current systems can involve the user directly interacting with the service device. For example, the service device can include a user interface with options for the functions. The user can select, via the user interface, an option to cause the service device to perform a function. Additionally, there can be security concerns with the current systems. For example, in the current systems, a pin number, an access card, or a combination thereof can be used to authenticate with the service device. The user may input the pin number or the access card, both of which may be associated with the user account, via the user interface. The service device can authenticate the user based on the pin number or the access card, and can, for example, withdraw funds from the user account. However, if for example, the pin number or the access card, are stolen, the service device may not be able to detect the security breach and may still perform the withdrawal of funds. Additionally, due to the security concerns with current systems, the functions that the service devices can perform may be limited. For example, the user may only be able to withdraw funds up to a withdraw limit (e.g., up to $500) via the service device.

Examples of the present disclosure can overcome one or more of the above-mentioned problems via the terminal handler that can receive requests for the IoT service devices to perform functions from the mobile devices. The terminal handler can further authenticate the mobile devices and users of the mobile devices prior to causing the IoT service devices to perform the functions. In this way, the terminal handler can facilitate secure interactions between the IoT service devices and the user accounts. For example, if a user's authentication credentials are stolen, a request for an IoT service device to perform a function with respect to a user account may be transmitted with the authentication credentials. In response, the terminal handler may authenticate the user based on the authentication credentials. But, if the mobile device from which the request was transmitted is not registered to the user account, the terminal handler may not authenticate the mobile device. Thus, the terminal handler may detect a possible security breach and may not perform the requested function. Due to the improved security of authenticating both the mobile device and the user, the terminal handler may enable and permit the IoT device to perform highly secure service events, such as a withdrawal of funds above the withdrawal limit. Additionally, due to the terminal handler causing the IoT service devices to perform the functions in response to the requests transmitted via the mobile devices, the secure interactions can be initiated in a contactless manner. Therefore, the IoT service devices may not include screens or other suitable mechanisms for user interaction.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a IoT service device environment 100 according to one example of the present disclosure. The IoT service device environment 100 can include an indoor area 143 and an outdoor area 145. The IoT service device environment 100 can also include user accessible areas 152 and user inaccessible areas 154. The user accessible areas 152 can include at least one user 146, authorized personnel 148, at least one user vehicle 150, one or more devices 104, and a plurality of IoT service devices 106. The IoT service device environment 100 can also include one or more communication networks 140 and a computing platform 142. Examples of the computing platform 142 include cloud platforms or Internet of Things (IoT) platforms. The computing platform 142 can include a terminal handler 201. The user inaccessible areas 154 can include at least one auxiliary device 108.

The one or more devices 104 and the terminal handler 201 of the computing platform 142 can send and receive communication with each IoT service device of the plurality of IoT service devices 106 over the one or more communication networks 140. The terminal handler 201 can send and receive communication with the one or more devices 104. The one or more communication networks 140 may correspond to one or more Wide Area Networks ("WANs"), such as the Internet, through which the terminal handler 201, the one or more devices 104, and each IoT service device of the plurality of IoT service devices 106 may communicate with servers via web browsers or user-side applications, to establish communication sessions, request and receive web-based resources, and access other features of applications or services.

The plurality of IoT service devices 106 can include IoT service devices 106a-106h. Although eight IoT service devices are depicted in FIG. 1, the plurality of IoT service devices 106 can include any number of IoT service devices, including one IoT service device. As illustrated in FIG. 1, some IoT service devices of the plurality of IoT service devices 106 can be indoor IoT service devices (106a-106f) located in the indoor area 143. Other IoT service devices can be outdoor IoT service devices (106g and 106h) located in the outdoor area 145. The outdoor IoT service devices (106g and 106h) can be accessible to a user within the at least one user vehicle 150.

Each IoT service device can include or be associated with a near-field communication (NFC) token. A user of the one or more devices 104 can request access to a IoT service device by performing a tap gesture by placing the one or more devices 104 close to the NFC token on or near the IoT service device. In some examples, a user can request access to the IoT service device by performing a similar tap gesture by placing an access card close to the NFC token. Examples of IoT service devices can include ATMs, electronic funds transfer (EFT) terminals, teller cash recyclers (TCRs), check scanners, printers, etc. In some examples, the IoT service device can only be accessible via the mobile device, meaning the IoT service device can lack a screen or other suitable mechanisms for user interaction.

As illustrated in FIG. 1, devices 104a-104c, including tablet computers 104a, smartphones 104b, and smart watches 104c, may access any service device of the plurality of IoT service devices 106 via a Local Area Network ("LAN") or WAN, as well as mobile telecommunication networks, short-range wireless networks, or various other communication network types (e.g., cable or satellite networks). Although certain examples herein are described in terms of mobile devices, in other examples, the one or more devices 104 may additionally or alternatively include other mobile or non-mobile devices (e.g., desktop computers, laptop computers, and the like) capable of accessing any service device of the plurality of IoT service devices 106 via the one or more communications networks 140. The one or more devices 104 can be a user-based device associated with the at least one user 146 or a device associated with the authorized personnel 148.

The one or more devices 104 can transmit requests that the at least one IoT service device of the plurality of IoT service devices 106 perform at least one function. The terminal handler 201 of the computing platform 142 can receive the request, authenticate the one or more devices 104, and, upon authentication, transmit an API call to the at least one IoT service device to cause the IoT service device to perform the at least one function.

The terminal handler 201 of the computing platform 142 can manage each IoT service device of the plurality of IoT service devices 106 and the at least one auxiliary device 108. The at least one auxiliary device 108 can include auxiliary devices that are accessible only by authorized personnel 148, such as printers, copiers, or user inaccessible IoT service devices. The terminal handler 201 can receive requests for each IoT service device to perform the at least one function, grant or deny the requests, initiate a step-up authentication protocol, detect an issue with any IoT service device, notify the authorized personnel 148 of the issue, or contact a technician specialist to resolve the issue.

Examples of the issues can include technical issues (i.e., a technical malfunction of the IoT service device), routine maintenance issues (i.e., a TCR has run out of cash, the at least one auxiliary device 108 is out of paper, etc.), nonroutine maintenance issues, or issues with authenticating a device associated with a user (i.e., the user recently changed devices or changed addresses).

In some examples, the authorized personnel 148 can use a device associated with the authorized personnel 148 to request that at least one IoT service device of the plurality of IoT service devices 106 perform the at least one function. Thus, the request by the authorized personnel 148 can be an initial request to initiate a service event on behalf of a user. In other examples, the request by the authorized personnel 148 can be a second request following a first request initiated by the at least one user 146 through a user-based device. The second request can occur when the terminal handler 201 notifies the authorized personnel of an issue, such as an authentication issue associated with the user-based device. The authorized personnel can supplement or override an authentication protocol and assist in completing the interaction event on behalf of the user.

Figure 2:
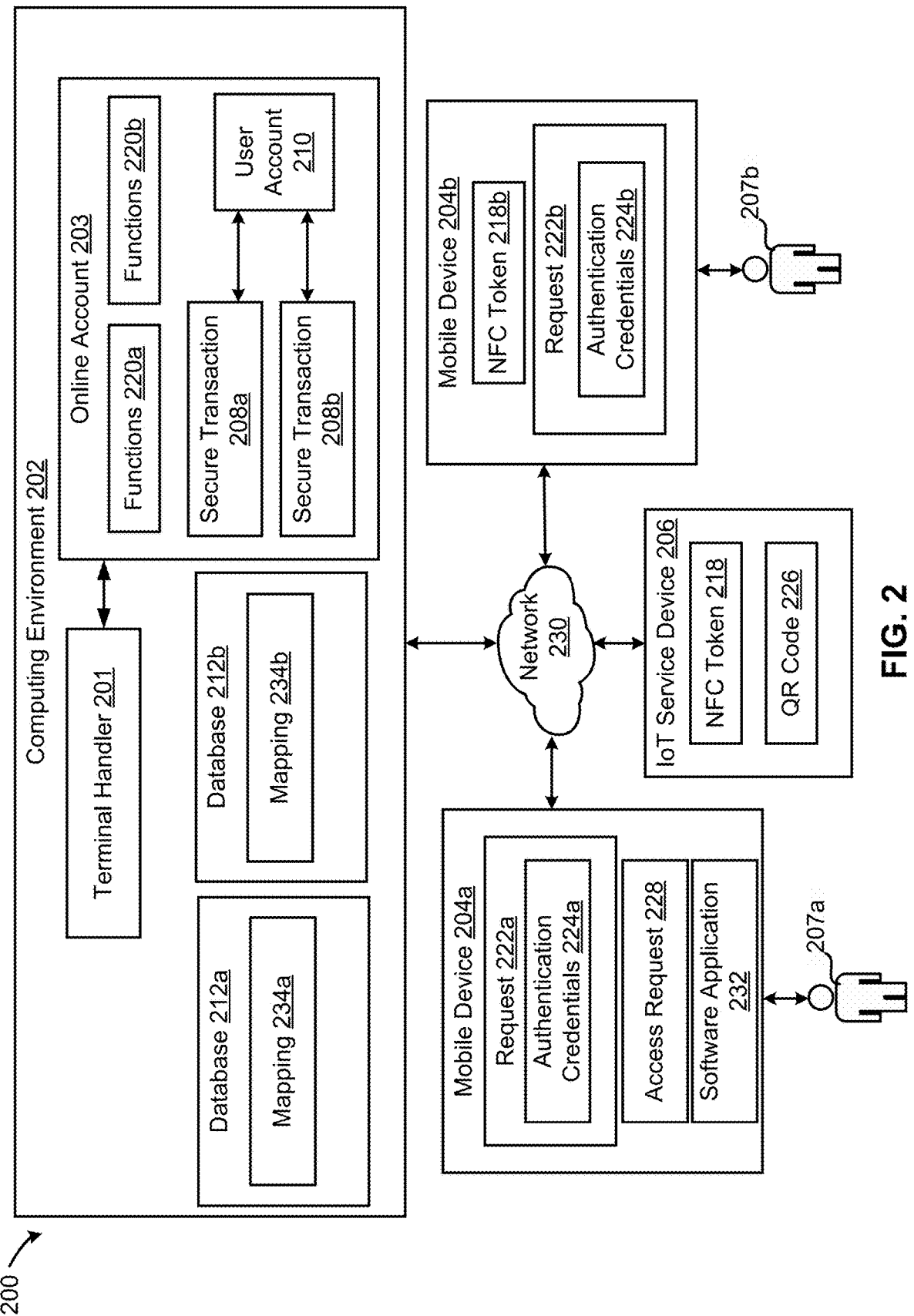
FIG. 2 is a block diagram of an example of a system for facilitating secure transactions between IoT service devices and user accounts by a terminal handler according to one example of the present disclosure.

FIG. 2 is a block diagram of an example of a system 200 for facilitating secure transactions between IoT service devices and user accounts by a terminal handler 201 according to one example of the present disclosure. The system 200 includes a computing environment 202. In some examples, the computing environment 202 may be a distributed computing environment, such as a cloud computing system, an IoT computing platform, or a computing cluster, formed from one or more nodes (e.g., physical or virtual servers) that are in communication with one another via a network 230. Additionally, in some examples, the computing environment 202 can correspond to computing platform 142 of FIG. 1. Additionally, the computing environment 202 can be in communication with mobile devices 204a-b and an IoT service device 206 via the network 230. Examples of the network 230 can include a local area network (LAN) or the Internet. The computing environment 202 can be formed from a physical infrastructure that includes various network hardware, such as routers, hubs, bridges, switches, and firewalls. The physical infrastructure can also include one or more servers. The servers may provide backend support for a software application 232 (e.g., a mobile application) or may provide a web interface for enabling a user to interact with the IoT service device 206, a user account 210, or a combination thereof.

The computing environment 202 can include the terminal handler 201. The terminal handler can act as a central hub of the system 200, leveraging computing technology and algorithms to provide users with secure access to IoT service devices and facilitate service interactions with the IoT service devices. The terminal handler 201 can be built with advancements in data encryption and protection protocols and safeguard user account data and confidentiality at all times. The terminal handler 201 can be continuously updated to interact with new and updated IoT service devices, new and updated mobile devices, and to implement advancements in authentication protocols.

In an example, a first user 207a may establish the user account 210 with a service provider. The user account 210 may be of any suitable type of account. For example, the service provider may be a bank and the user account 210 may be a deposit account. Separately from establishing the user account 210, the first user 207a may register for an online account 203 with the service provider for use in monitoring and performing functions related to the underlying user account 210. The first user 207a may then link the online account to the underlying user account 210 hosted by the service provider. The first user 207a can also register the online account 203 with a first mobile device 204a. Examples of the first mobile device 204a can include a mobile phone, a laptop, a tablet, or a smart watch. Additionally, the online account 203 can be in communication with the IoT service device 206 such that the online account 203 can be used to access and control the IoT service device 206.

As a result of registering the online account 203 with the first mobile device 204a, the first user 207a may obtain access to the online account 203 via the software application 232 executing on the first mobile device 204a. For example, the first user 207a may access the online account 203 via the mobile application or the web interface. In doing so, due to the online account 203 being in communication with the IoT service device 206, the first user 207a can obtain access to a first set of functions 220a of the IoT service device 206 and can transmit requests for the IoT service device 206 to perform the functions 220a.

For example, to obtain access to functions 220a, the first mobile device 204a may transmit an access request 228 to a terminal handler 201 of the computing environment 202. The first mobile device 204a may transmit the access request 228 in response to the first user 207a performing a contactless authentication process with the IoT service device 206. For example, the IoT service device 206 can be positioned within a location (e.g., IoT service device environment 100). The location of the IoT service device 206 may be a secured location controlled by or otherwise associated with the service provider. Additionally, the IoT service device 206 may be one of many IoT service devices within the location. For example, the IoT service device 206 may be an ATM and the location may include one or more additional ATMs, EFT terminals, TCRs, check scanners, printers, or other suitable types of IoT service devices associated with the server provider. Each of the IoT devices can be associated with a unique Quick Response (QR) code. For example, QR code 226 can be associated with the IoT service device 206. Therefore, the first user 207a may perform the contactless authentication process by scanning the QR code 226 for the IoT service device 206.

Additionally, or alternatively, the IoT service devices may include near field communication (NFC) tokens. For example, the IoT service device 206 can include NFC token 218. Therefore, in some examples, the first user 207a may perform the contactless authentication process by performing a tap gesture with respect to an NFC token, such as NFC token 218. For example, the first user 207a may perform the tap gesture by placing the mobile device 204a or a card close (e.g., within four inches) to the NFC token 218. In response to the tap gesture, communication between mobile device 204a and the IoT service device 206 can be established. The mobile device 204a can then transmit the access request 228 via the communication with the NFC token 218.

In response to receiving the access request 228 from the mobile device 204a, the terminal handler 201 may identify the IoT service device 206. For example, due to the location associated with the service provider including multiple IoT service devices, the terminal handler 201 may identify which IoT service device 206 is associated with the access request 228 from the mobile device 204a. In an example, the terminal handler 201 may identify the IoT service device by accessing a first database 212a with a first mapping 234a that relates to each of the IoT service devices for the location or associated with the service provider to a corresponding QR code. Thus, the terminal handler 201 can determine that the access request 228 from the mobile device 204a is for the IoT service device 206 based on the first mapping 234a associating the QR code 226 to the IoT service device 206.

Additionally, in response to receiving the access request 228 from the mobile device 204a, the terminal handler 201 may further identify a user account 210 associated with the mobile device 204a and with the service provider. For example, the first user 207a may register the mobile device 204a with the user account 210, the online account 203, or a combination thereof. A second database 212b can include a second mapping 234b that relates mobile devices to corresponding user accounts based on the mobile devices being registered. Thus, the terminal handler 201 may identify the user account 210 by accessing the second database 212b and determining based on the second mapping 234b, that the user account 210 is associated with the mobile device 204a.

Subsequent to identifying the IoT service device 206 and the user account 210, the terminal handler 201 can provide access for the mobile device 204*a* to functions 220*a* of the IoT service device 206 via the software application 232 associated with the service provider. Therefore, the contactless authentication process can result in a digital handshake between the mobile device 204 and the IoT service device 206. Due to the digital handshake (i.e., the access provided for the mobile device 204 to the functions 220*a* via the software application 232), the functions 220*a* can be used to facilitate one or more secure transactions between the IoT service device 206 and the user account 210.

In another example, the first user 207*a* may obtain initial access to the online account 203, such as by accessing the mobile application on the first mobile device 204*a*. Then, the first user 207*a* may perform an authentication process at the initial access. For example, the first user 207*a* can provide first authentication credentials 224*a* (e.g., a username and password) at the initial access. Completion of the authentication process can cause the first mobile device 204*a* to automatically transmit a request 222*a* for the IoT service device 206 to perform one or more of the functions 220*a*-*b*.

Completion of the authentication process can cause the terminal handler 201 of the computing environment 202 to provide access for the first mobile device 204*a* to the online account 203. The online account 203 can include the options for the functions 220*a*, which can be selected by the first user 207*a* via the first mobile device 204*a*. Selection of a function by the first user 207*a* can cause the first mobile device 204*a* to transmit a request for the IoT service device 206 to perform a function to the terminal handler 201 of the computing environment 202.

In a particular example, the mobile device 204*a* may transmit the request 222*a* to the terminal handler 201. The request 222*a* can be a request for the IoT service device 206 to perform a function from the set of functions 220*a*. For example, the IoT service device 206 can be an ATM that is in communication with the terminal handler 201 via the network 230 and the function from the first set of functions 220*a* can be for withdrawing funds from the user account 210. The request 222*a* can include an amount of funds to be withdrawn. The request 222*a* can also include authentication credentials 224*a*, which may be associated with the online account 203, the user account 210, the IoT service device 206, or a combination thereof.

In response to receiving the request 222*a*, the terminal handler 201 can authenticate the mobile device 204*a*. The terminal handler 201 may also authenticate the first user 207*a* of the mobile device 204*a*. To authenticate the first user 207*a*, the terminal handler 201 may verify that the authentication process was successful (i.e., verify that the username and password are valid for authenticating with the online account 203). Additionally or alternatively, the terminal handler 201 may verify that the authentication credentials 224*a* are valid for authenticating with the user account 210, online account 203, the IoT service device 206, or a combination thereof.

In some examples, the terminal handler 201 can select the IoT service device 206 from a group of IoT service devices at the location. The selection can be based on at least one real-time parameter associated with the IoT service device 206. For example, the terminal handler 201 can select an IoT service device 206 that is available, capable of resolving the request 222*a*, and is proximate to the mobile device 204*a*. Examples of real-time parameters associated with the IoT service device 206 can include availability, a current amount of resources, a position within the location associated with the server provider, a duration since a most recent maintenance check-up, etc. The current amount of resources can be, for example, an amount of paper when the IoT service device is a printer or an amount of funds when the IoT service device is an ATM. Subsequent to selecting the IoT service device 206, the terminal handler 201 can indicate to the user 207*a* which IoT service device is the IoT service device 206. The indication can be made, for example, via a graphical element associated with the software application 232.

Additionally, to authenticate the mobile device 204*a*, the terminal handler 201 can determine that the mobile device 204*a* is proximate to the IoT service device 206. For example, the terminal handler 201 may detect a location of the mobile device 204*a*, such as by accessing location services of the mobile device 204*a*. Then, the terminal handler 201 may determine a distance between the location of the mobile device 204*a* and a location of the IoT service device 206. The location of the IoT service device 206 may be a secure location controlled by or otherwise associated with the service provider. The terminal handler 201 may further determine that the distance is less than a threshold distance to authenticate the mobile device 204*a*.

Moreover, in some examples, the terminal handler 201 may detect that the first mobile device 204*a* scanned the QR code 226 to determine that the first mobile device 204*a* is proximate to the IoT service device 206. Additionally or alternatively, the terminal handler 201 may determine that the mobile device 204*a* is proximate the IoT service device 206 using the NFC token 218.

After authenticating the first user 207*a* and the first mobile device 204*a*, the terminal handler 201 can transmit an application programming interface (API) call or otherwise communicate with the IoT service device 206 to cause the IoT service device to perform the function from the set of functions 220*a*. In the example, the API used by the terminal handler 201 can be an extension for financial services (XFS). In particular, the API can be XFS4. Therefore, the terminal handler 201 can communicate with and cause the IoT service device 206 to perform the function from the set of functions 220*a* by transmitting the API call via the API (e.g., the XFS4). In this way, the terminal handler 201 can automatically cause the IoT service device 206 to perform the function from the set of functions 220*a* in response to the first request 222*a*. The function from the first set of functions 220*a* can be a secure transaction 208*a* between the IoT service device 206 and the user account 210, such as a withdrawal of the amount of funds from the user account 210 as indicated by the first request 222*a*.

Additionally or alternatively, the terminal handler 201 may receive a second request 222*b* from a second mobile device 204*b*. The second mobile device 204*b* can be an authorized device for the service provider. Thus, the second mobile device 204*b* can have higher privileges than the first mobile device 204*a*. For example, the second mobile device 204*b* can be used to request that the IoT service device 206 perform functions from a second set of functions 220*b* or may be used to request access to the online account 203, the user account 210, or a combination thereof on behalf of the first mobile device 204*a*. The second set of functions 220*b* can include all functions in the first set of functions 220*a* as well as additional functions. Additionally, the second mobile device 204*b* can be operated by a second user 207*b*. The second user 207*b* can be authorized personnel associated with the service provider or the IoT service device 206.

In an example, the terminal handler 201 may detect an issue with the first request 222*a*. The issue may include the first authentication credentials 224a being invalid, the first mobile device 204a not being the registered mobile device for the user account 210, the terminal handler 201 being unable to detect the proximity of the first mobile device 204a to the IoT service device 206, etc. In response to detecting the issue, the terminal handler 201 may transmit a notification of the issue to the second mobile device 204b. The notification may further prompt the second mobile device 204b to transmit the second request 222b.

In response to receiving the second request 222b, the terminal handler 201 can authenticate the second mobile device 204b. The terminal handler 201 may also authenticate the second user 207b. For example, the terminal handler 201 may authenticate the second user 207b by verifying that second authentication credentials 224b included in the second request 222b are valid for authorized personnel associated with the service provider.

Additionally, to authenticate the second mobile device 202b the terminal handler 201 may verify that the second mobile device 202b is registered with the service provider or with the IoT service device 206 (i.e., verify that the second mobile device 202b is an authorized device). Additionally, the terminal handler may determine that the second mobile device 202b is proximate to the IoT service device 206 using NFC, location services of the second mobile device 204b, etc. In some examples, due to the higher privileges of the second mobile device 204b, the authentication of the second mobile device 204b may be more efficient than authentication of the first mobile device 204a.

Additionally, in some examples, the terminal handler 201 may further determine the second mobile device 204b is proximate to the first mobile device 204a to authenticate the second mobile device 204b. For example, the second request 222b can be a request for the IoT service device 206 to perform a second function from among the second set of functions 220b on behalf of the first mobile device 204a. Thus, the second mobile device 204b may include or be associated with a second NFC token 218b. The first mobile device 204a or another suitable entity (e.g., a card associated with the user account 210) may be used to tap the second NFC token 218b. In this way, communication between the first mobile device 204a and the second mobile device 204b can be established, the second mobile device 204b can be authenticated, or a combination thereof.

After the second mobile device 204b is authenticated, the terminal handler 201 can transmit an application programming interface (API) call or otherwise communicate with the IoT service device 206 to cause the IoT service device to perform a function. For example, the second request 222b may have been a request for the IoT service device 206 to perform a second function from among the second set of functions 220a-b. Thus, the terminal handler 201 can cause the IoT service device 206 to perform the second function via the API call. The second function can be a second secure transaction 208b between the IoT service device 206 and the user account 210. For example, the IoT service device 206 can deposit a certain amount of funds to the user account 210.

In some examples, the terminal handler 201 can connect to, monitor, and maintain the system 200. The terminal handler 201 can manage interactions between the computing environment 202, the IoT service device 206, and the mobile devices 204a-b. The terminal handler 201 may also be able to monitor the IoT service device 206. For example, the terminal handler 201 may monitor cash levels of the ATM.

Figure 3:
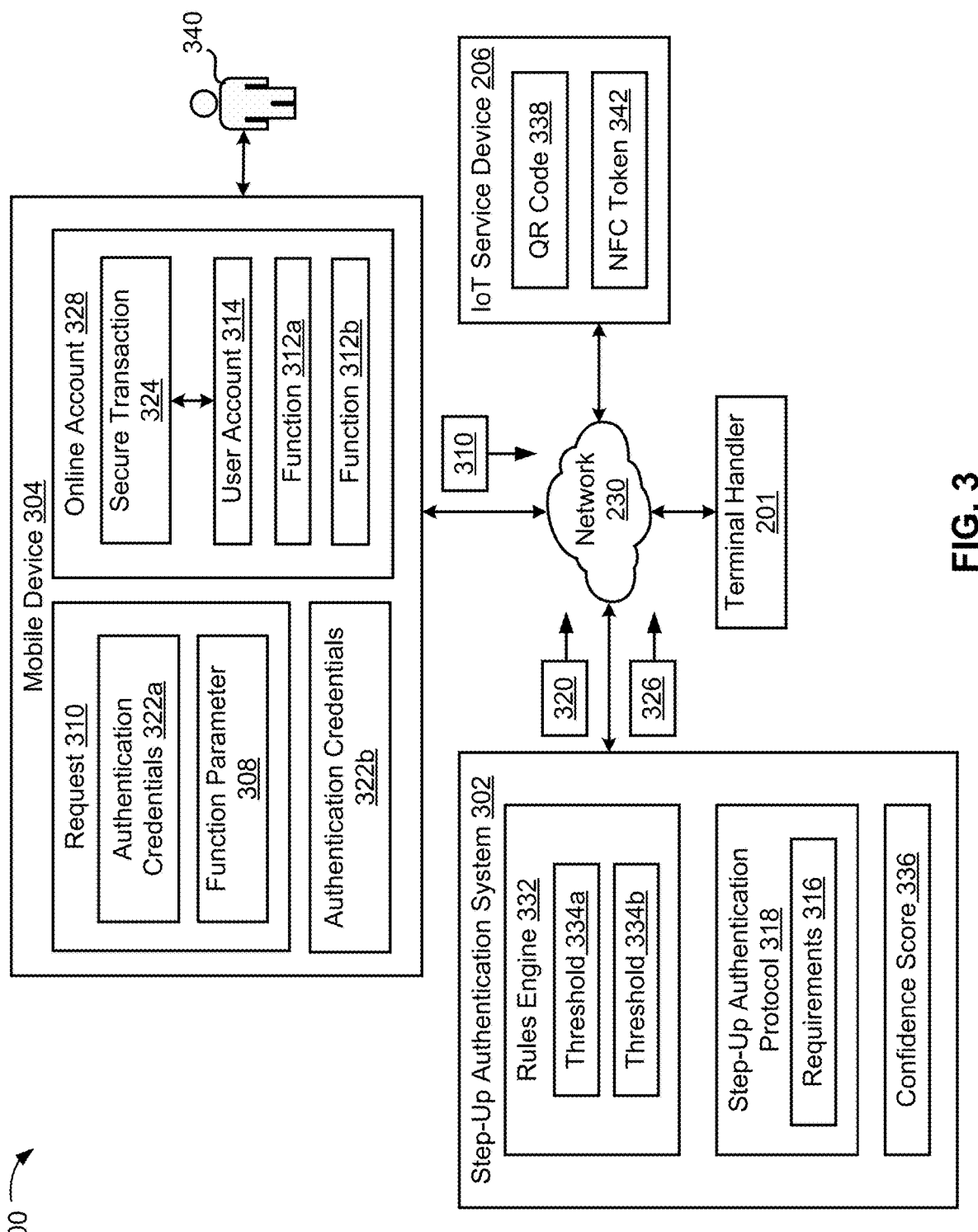
FIG. 3 is a block diagram of an example of a system for implementing a step-up authentication protocol by a terminal handler to facilitate secure transactions between IoT service devices and user accounts according to one example of the present disclosure.

FIG. 3 is a block diagram of an example of a system 300 for implementing a step-up authentication protocol 318 by a terminal handler 201 to facilitate secure transactions between IoT service devices and user accounts according to one example of the present disclosure. In some examples, the system 300 may be include a distributed computing environment, such as a cloud computing system, an IoT computing platform, or a computing cluster, formed from one or more nodes (e.g., physical or virtual servers) that are in communication with one another via a network 230. Additionally, the system 300 can include a step-up authentication system 302, which can be communicatively coupled to a mobile device 304, the terminal handler 201, and an IoT service device 206 via the network 230. In some examples, the step-up authentication system 302 can be an aspect or a component of the terminal handler 201. Examples of the network 230 can include a local area network (LAN) or the Internet. The computing environment of the system 300 can be formed from a physical infrastructure that includes various network hardware, such as routers, hubs, bridges, switches, and firewalls. The physical infrastructure can also include one or more servers. The servers may provide backend support for a mobile application or may provide a web interface for enabling a user to interact with the IoT service device 206, the user account 314, or a combination thereof.

The system 300 can include the terminal handler 201. The terminal handler can act as a central hub of the system 300, leveraging computing technology and algorithms to provide users with secure access to IoT service devices and facilitate service interactions with the IoT service devices. The terminal handler 201 can be built with advancements in data encryption and protection protocols and safeguard user account data and confidentiality at all times. The terminal handler 201 can be continuously updated to interact with new and updated IoT service devices, new and updated mobile devices, and to implement advancements in authentication protocols.

In an example, a user 340 may establish the user account 314 with a service provider. The user account 314 may be of any suitable type of account. For example, the service provider may be a bank and the user account 314 may be a deposit account. Separately from establishing the user account 314, the user 340 may register for an online account 328 with the service provider for use in monitoring and performing functions related to the underlying user account 314. The user 340 may then link the online account 328 to the underlying user account 314 hosted by the service provider. The user 340 can also register the online account 328 with the mobile device 304. Examples of the mobile device 304 can include a mobile phone, a laptop, a tablet, or a smart watch. Additionally, the online account 328 can be in communication with the IoT service device 206 such that the online account 328 can be used to access and control the IoT service device 206.

As a result of registering the online account 328 with the mobile device 304, the user 340 may obtain access to the online account 328 via the mobile device 304. For example, the user 340 may access the online account 328 via the mobile application or the web interface. In doing so, due to the online account 328 being in communication with the IoT service device 206, the user 340 can obtain access to functions 312a-b of the IoT service device 206 and can transmit requests for the IoT service device to perform the functions 312a-b.

In some examples, the user 340 may obtain initial access to the online account 328, such as by accessing the mobile application on the mobile device 304. Then, the user 340 may perform a first authentication process at the initial access. For example, the user 340 can provide first authentication credentials 322*a* (e.g., a username and password) at the initial access. In a particular example, a QR code 338 associated with the IoT service device 206 can be scanned using the mobile device 304. The scanning of the QR code 338 can cause the user 340 to obtain the initial access and be prompted to perform the authentication process via the mobile device 304. Completion of the authentication process can cause the mobile device 304 to automatically transmit a request for the IoT service device 206 to perform one or more of the functions 312*a-b*.

In another example, completion of the first authentication process can cause the step-up authentication system 302 of the system 300 or the terminal handler 201 to provide access for the mobile device 304 to the online account 328. The online account 328 can include the options for the functions 312*a-b*, which can be selected by the user 340 via the mobile device 304. Selection of an option for a function by the user 340 can cause the mobile device 304 to transmit a request for the IoT service device 206 to perform a function to the terminal handler 201.

In a particular example, the mobile device 304 may transmit a request 310 to the terminal handler 201. The request 310 can be a request for the IoT service device 206 to perform a first function 312*a*. For example, the IoT service device 206 can be an ATM that is in communication with the step-up authentication system 302 and the terminal handler 201 via the network 230 and the first function 312*a* can be for withdrawing funds from the user account 314. The request 310 can include an amount of funds to be withdrawn. The request 310 can also include the first authentication credentials 322*a*, which may be associated with the online account 328, the user account 314, the IoT service device 206, or a combination thereof.

The terminal handler 201 can determine that the request 310 satisfies one or more requirements of a step-up authentication protocol 318. The terminal handler 201 can communicate the request 310 to the step-up authentication system 302. The step-up authentication protocol 318 can be a highly secure authentication process, in which a user can be required to perform more than one authentication process. The step-up authentication protocol 318 can include requirements 316 or rules defining when to implement the step-up authentication protocol 318. The step-up authentication system 302 can further include a rules engine 332 for governing and determining the requirements 316. In some examples, the step-up authentication system 302 and the rules engine 332 can be components of the terminal handler 201.

For example, the rules engine 332 can include a first rule involving a first threshold 334*a*. The first threshold 334*a* can be a confidence score threshold, and the first rule can state that if a confidence score for a request is less than the first threshold 334*a*, then the step-up authentication protocol 318 should be executed. Therefore, in some examples, the step-up authentication system 302 may determine a confidence score 336 for the request 310 based on the first function 312*a*, the first authentication credentials 322*a*, other suitable information included in the request 310 (e.g., an amount of funds to be withdrawn), account details of the user account 314 or the online account 328, or a combination thereof. The step-up authentication system 302 may determine a lower confidence score for a request associated with a user account 314 or online account 328 to which recent changes were made (e.g., a change to authentication credentials for logging into the user account 314 or the online account 328). Additionally, the step-up authentication system 302 can determine a lower confidence score if the mobile device 304 that transmitted the request 310 is currently unregistered with the user account 314 or the online account 328.

Additionally, the rules engine 332 may generate different thresholds based on the functions 312. For example, a second function 312*b* can be associated with transferring funds between the user account 314 and a secondary account associated with the service provider and belonging to the user 340. For example, the secondary account may be a savings account. Therefore, a confidence threshold associated with the second function 312*b* may be lower than the first threshold 334*a*.

Additionally or alternatively, the rules engine 332 can include a second rule involving a second threshold 334*b*. The second threshold 334*b* can be a function parameter threshold. For example, the request 310 can include a function parameter 308. For the first function 312*a*, the function parameter can be an amount of funds to be withdrawn. Therefore, the second rule may state that if the amount of funds for the first function 312*a* exceeds the second threshold 334*b*, the step-up authentication protocol 318 should be executed.

After determining that the request 310 satisfies the requirements 316, the step-up authentication system 302 may transmit an authentication request 320 to the mobile device 304 for second authentication credentials 322*b*. The second authentication credentials 322*b* can be a one-time passcode (OTP), a fingerprint or face identification, a second username and second password, or another suitable type of authentication credential. The mobile device 304 can receive the authentication request 320 as, for example, a push notification. The user 340 may select the push notification and provide the second authentication credentials 322*b* via a second authentication process performed using the mobile device 304.

The step-up authentication system 302 may then authenticate the user 340 of the mobile device 304 based on the first authentication credentials 322*a* and the second authentication credentials 322*b*. For example, the step-up authentication system 302 may verify that the first authentication process and the second authentication process were successful (i.e., verify that the first authentication credentials 322*a* and the second authentication credentials 322*b* are valid for authenticating with the user account 314 or the online account 328).

Additionally, to authenticate the mobile device 304, the step-up authentication system 302 can determine that the mobile device 304 is proximate to the IoT service device 206. For example, the terminal handler 201 may detect a location of the mobile device 304, such as by accessing location services of the mobile device 304. Then, the terminal handler 201 may inform the step-up authentication system 302 of a determined distance between the location of the mobile device 304 and a location of the IoT service device 206. The location of the IoT service device 206 may be a secure location controlled by or otherwise associated with the service provider. The step-up authentication system 302 may further determine that the distance is less than a threshold distance to authenticate the mobile device 304.

Moreover, in some examples, the terminal handler 201 may detect that the mobile device 304 scanned the QR code 338 to determine that the mobile device 304 is proximate to the IoT service device 206. Additionally or alternatively, the terminal handler 201 may determine that the mobile device 304 is proximate the IoT service device 206 using NFC and inform the step-up authentication system 302. For example, the IoT service device 206 can have or can be associated with a first NFC token 342. The user 340 may perform a tap gesture by placing the mobile device 304 close (e.g., within four inches) to the NFC token 342. In response to the tap gesture, communication between the mobile device 304 and the IoT service device 206 can be established and the proximity of the mobile device 304 to the IoT service device 206 can be verified.

Additionally, in some examples, the terminal handler 201 may authenticate the mobile device 304 by verifying that the mobile device 304 is a registered device for the online account 328 and/or the user account 314. For example, the system 300 can generate a database. The database can include registered devices and corresponding user accounts. The database can be updated by the system 300 to establish the mobile device 304 as a registered mobile device for the user account 314. In doing so, the mobile device 304 can also be the registered mobile device for the online account 328. Therefore, the terminal handler 201 can, in response to receiving the request 310, access the database to verify that the request 310 was received from the registered mobile device for the user account 314.

After authenticating the user 340 based on the first authentication credentials 322a and the second authentication credentials 322b, and further authenticating the mobile device 304, the terminal handler 201 can transmit an application programming interface (API) call or otherwise communicate with the IoT service device 206 to cause the IoT service device 206 to perform the first function 312a. In the example, the API used by the terminal handler 201 can be an extension for financial services (XFS). In particular, the API can be XFS4. Therefore, the terminal handler 201 can communicate with and cause the IoT service device 206 to perform the first function 312a by transmitting the API call via the API (e.g., the XFS4). In this way, the terminal handler 201 can automatically cause the IoT service device 206 to perform the first function 312a in response to the request 310. The first function 312a can be a secure transaction 324 between the IoT service device 206 and the user account 314, such as a withdrawal of the amount of funds from the user account 314 as indicated by the request 310.

Figure 4:
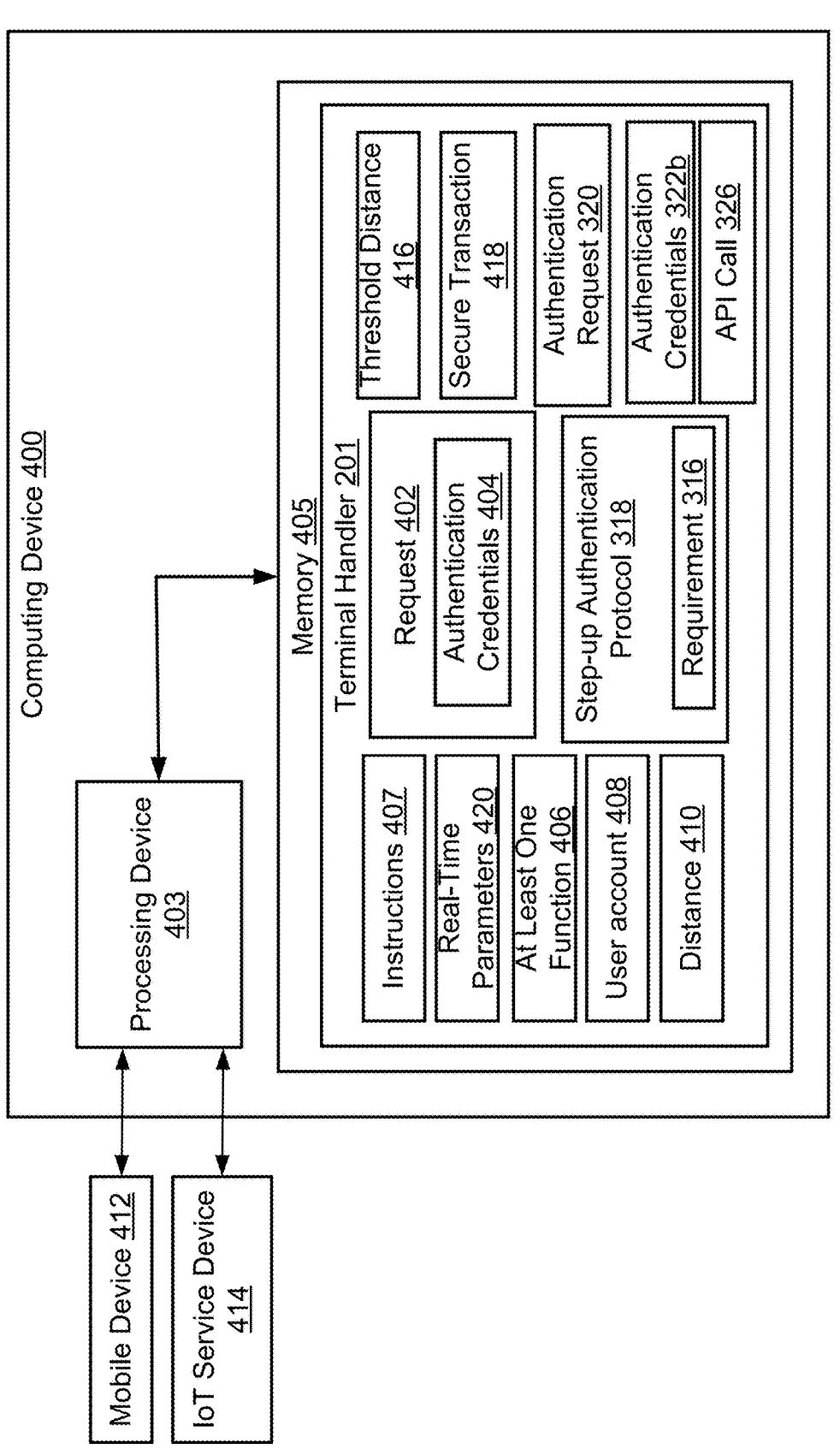
FIG. 4 is a block diagram of an example of a computing device for facilitating secure transactions between IoT service devices and user accounts involving a terminal handler according to one example of the present disclosure.

FIG. 4 is a block diagram of an example of a computing device 400 for facilitating secure transactions between IoT service devices and user accounts involving a terminal handler according to one example of the present disclosure. The components shown in FIG. 4, such as the processing device 403, the memory 405, and the like, may be integrated into a single structure such as within the single housing of the computing device 400. Alternatively, the components shown in FIG. 4 can be distributed from one another and in electrical communication with each other.

As shown, the computing device 400 includes the processing device 403 communicatively coupled to the memory 405. The processing device 403 can include one processor or multiple processors. Non-limiting examples of the processing device 303 include a Field-Programmable Gate Array (FPGA), an application specific integrated circuit (ASIC), a microprocessor, or any combination of these. The processing device 403 can execute instructions 407 stored in the memory 405 to perform operations. In some examples, the instructions 407 can include processor-specific instructions generated by a compiler or an interpreter from code written in any suitable computer-programming language, such as C, C++, C#, Python, or Java.

The memory 405 can include one memory device or multiple memory devices. The memory 405 can be non-volatile and may include any type of memory device that retains stored information when powered off. Non-limiting examples of the memory 405 include electrically erasable and programmable read-only memory (EEPROM), flash memory, or any other type of non-volatile memory. At least some of the memory 405 can include a non-transitory computer-readable medium from which the processing device 403 can read instructions 407. The non-transitory computer-readable medium can include electronic, optical, magnetic, or other storage devices capable of providing the processing device 403 with the instructions 407 or other program code. Non-limiting examples of the non-transitory computer-readable medium include magnetic disk(s), memory chip(s), RAM, an ASIC, or any other medium from which a computer processor can read instructions 407.

The memory 405 can further include a terminal handler 201. The terminal handler 201 can execute the instructions 407 to perform operations. For example, the terminal handler 201 can receive, from a mobile device 412, a request 402 to perform at least one function 406 of an IoT service device 414. The IoT service device 414 can be, for example, IoT service device 206 from FIG. 1-3. The IoT service device 414 can be positioned in a location associated with a service provider. In some examples, the terminal handler 201 can select the IoT service device 414 based on real-time parameters 420 associated with IoT service device 414.

The request 402 can include authentication credentials 404 associated with a user account 408. The terminal handler 201 can authenticate a user of the mobile device 412 based on the authentication credentials 404. The terminal handler 201 can also authenticate the mobile device 412 based on a distance 410 between a location of the mobile device and the location associated with service provider being less than a threshold distance 416. Additionally, in response to authenticating the user and the mobile device 412, the terminal handler 201 can transmit an application programming interface (API) call 326 to the IoT service device 414 to cause the IoT service device to perform the at least one function 406. The at least one function 406 can involve a secure transaction 418 between the IoT service device 414 and the user account 408.

In some examples, the terminal handler 201 can further determine that the request 402 satisfies at least one requirement 316 of a step-up authentication protocol 318. Additionally, in response to determining that the request 402 satisfies the at least one requirement 316, the processing device 303 can transmit an authentication request 320 for second authentication credentials 322b to the mobile device 412. The terminal handler 201 can further receive, from the mobile device 412, the second authentication credentials 322b. In some examples, the terminal handler 201 can authenticate the user of the mobile device 412 based on the first authentication credentials 404 and the second authentication credentials 322b before transmitting the API call 326.

FIG. 5 is a flowchart of a computer-implemented process 500 for facilitating secure transactions between IoT service devices and user accounts by a terminal handler 201 according to one example of the present disclosure. Operations of computer-implemented processes may be performed by software, firmware, hardware, or a combination thereof. The operations of the computer-implemented process 500 start at block 502. Other examples can include more steps, fewer steps, different steps, or a different order of the steps than is shown in FIG. 5. The steps of FIG. 5 are discussed below with reference to the components discussed above in relation to FIG. 2 and FIG. 4.

At block 502, the computer-implemented process 500 involves receiving, from a mobile device 412, a request 402 to perform at least one function 406 of a particular IoT service device 414, the request 402 including authentication credentials 404 for a user account 408 associated with a service provider. The particular IoT service device 414 can be positioned in a location associated with the service provider. For example, the service provider can be a financial entity and the location can be a bank associated with the financial entity. Additionally, the request 402 may be received by a computing environment 202, such as a IoT platform. The request 402 can be transmitted as a result of a user of the mobile device 412 interacting with an online account 203. The user may interact with the online account 203 via a mobile application or web interface accessible on the mobile device 412. The online account 203 can be linked to the user account 408. The authentication credentials 404 for the user account 408 may also be associated with the online account 203.

In some examples, the particular IoT service device 414 can be selected from a group of IoT service devices by the terminal handler 201 based on one or more real-time parameters 420 associated with the particular IoT service device 414. Examples of real-time parameters associated with the particular IoT service device 414 can include availability, a current amount of resources, a position within the location associated with the server provider, a duration since a most recent maintenance check-up, etc. The terminal handler 201 can track and update values for real-time parameters for each IoT service device in the group of IoT service devices. Subsequent to selecting the particular IoT service device 414, the terminal handler 201 can indicate to the user of the mobile device 412 which IoT service device is the particular IoT service device 414. The indication can be made, for example, via a graphical element associated with the software application associated with the server provider.

At block 504, the computer-implemented process 500 involves authenticating a user of the mobile device 412 based on the authentication credentials 404. Authenticating based on the authentication credentials 404 can include verifying that the authentication credentials 404 can be used to authenticate with the particular IoT service device 414, the online account 203, the user account 408, or a combination thereof. The computing environment 202 or a terminal handler 201 of the computing environment 202 may perform the authentication of the user.

At block 506, the computer-implemented process 500 involves authenticating the mobile device 412 based on a distance between a location of the mobile device 412 and the location associated with the service provider being less than a threshold distance. For example, the mobile device 412 can include a geolocation device for determining a location of the mobile device 412. Thus, the terminal handler 201, for example, may receive the location of the mobile device 412 and the location associated with the service provider. Then, the terminal handler 201 can determine the distance between the location of the mobile device 412 and the location associated with service provider and can determine whether the distance is less than the threshold distance.

At block 508, the computer-implemented process 500 involves, in response to authenticating the user and the mobile device 412, transmitting an application programming interface (API) call to the particular IoT service device 414 to cause the particular IoT service device 414 to perform the at least one function 406. The API call can be transmitted by the terminal handler 201. The at least one function 406 can involve a secure transaction, such as a transfer of data, between the user account 408 and the particular IoT service device 414.

In a particular example, the request 402 can be for the particular IoT service device 414 to withdraw funds from the user account 408. The request 402 may further include an amount of funds for withdrawal, and the amount of funds may exceed a withdrawal limit. Due to the amount of funds exceeding the withdrawal limit, a step-up authentication protocol can be performed. For example, an authentication request for additional authentication credentials can be transmitted to the mobile device 412. The additional authentication credentials can be a one-time passcode (OTP), voice, face, or fingerprint identification, or another suitable form of additional authentication. The mobile device 412 can transmit the additional authentication credentials in a second request. In response to authenticating the additional authentication credentials, the API call can be transmitted and the particular IoT service device 414 can withdraw the amount of funds.

FIG. 6 is a flow chart of an alternative computer-implemented process 600 for facilitating secure transactions between IoT service devices and user accounts by a terminal handler 201 according to one example of the present disclosure. Operations of computer-implemented processes may be performed by software, firmware, hardware, or a combination thereof. The operations of the computer-implemented process 600 start at block 602. Other examples can include more steps, fewer steps, different steps, or a different order of the steps than is shown in FIG. 6. The steps of FIG. 6 are discussed below with reference to the components discussed above in relation to FIG. 2 and FIG. 4.

At block 602, the computer-implemented process 600 involves receiving, from a second mobile device 204*b*, a second request 222*b* to perform the at least one function 406, the second mobile device 204*b* being an authorized device associated with the service provider, and the second request 222*b* including second authentication credentials 224*b* for authorized personnel associated with the service provider. The second request 222*b* can be received by the terminal handler 201. The second mobile device 204*b* can be registered with the terminal handler 201 or otherwise registered to be the authorized device. Additionally, in some examples, receiving the second request 222*b* can involve detecting a tap gesture of the second mobile device 204*b* to a NFC token 218 of a particular IoT service device 414.

Moreover, a second user 207*b*, who can be authorized personnel for the service provider, can initiate the second request 222*b* after receiving a notification of an issue from the terminal handler 201 of the computing environment 202 that manages the particular IoT service device 414. The issue may be associated with a first request 222*a* transmitted by a first mobile device 204*a*. The issue can include a technical issue (i.e., disrupted communication between the first mobile device 204*a* and the particular IoT service device 206) or the issue can include an authentication issue. Examples of authentication issues can be due to an address change or other suitable changes in identifying information for a first user 207*a* associated with the first mobile device 204*a*. The authentication issues may also be due to the first mobile device 204*a* being an un-registered mobile device, the first user 207*a* being a new user, the first request 222*a* involving an function in a specific category, a proximity of the first mobile device 204*a* to the particular IoT service device 206 being beyond a predetermined threshold distance 416, etc. The specific category can include withdrawal requests above a threshold amount.

At block 604, the computer-implemented process 600 involves authenticating the second user 207*b* of the second mobile device 204*b* based on the second authentication credentials 224*b*. Authenticating based on the second authentication credentials 224*b* can include verifying that the authentication credentials 404 can be used to authenticate with the particular IoT service device 414, the service provider, or a combination thereof. The terminal handler 201 may perform the authentication of the second user 207*b*.

Additionally, in some examples, the second user 207*b* can be asked to provide a secondary form of authorization as part of a multi-factor authentication protocol. For example, when prompted by the computing environment 202 or the terminal handler 201, the second user 207*b* can provide a passcode, touch a portion of the second mobile device for fingerprint recognition, accept a push notification to the second mobile device, or look into a camera of the second mobile device 204*b* for facial recognition. Once authenticated, the second user 207*b* can use the second mobile device 204*b* to supplement or override an authentication protocol for the first mobile device 204*a*. The computer-implemented process 600 can be terminated at block 604 if the terminal handler 201 fails to authenticate the second user 207*b*.

At block 606, the computer-implemented process 600 involves authenticating the second mobile device 204*b* based on the second mobile device being the authorized device associated with the service provider. For example, the second mobile device 204*b* may be registered with the service provider or registered with the particular IoT service device 414. The second mobile device 204*b* may be a tablet, laptop, or other suitable device and may be positioned in a location associated with the service provider.

Additionally or alternatively, authenticating the second mobile device 204*b* may include determining whether the second mobile device 204*b* is proximate to the particular IoT service device 414. For example, the second mobile device 204*b* can include a geolocation device to allow the computing environment 202 or the terminal handler 201 to determine a location of the second mobile device 204*b*. Then the proximity of the second mobile device 204*b* to the particular IoT service device 414 can be determined based on a distance between the location of the second mobile device 204*b* and the location associated with the service provider being less than a threshold distance 416, such as five meters. Additionally, in some examples, authenticating the second mobile device 204*b* can also include determining whether the second mobile device 204*b* is proximate to the first mobile device 204*a*. The first mobile device 204*a* can also include a geolocation device to allow the computing environment 202 or the terminal handler 201 to determine a location of the first mobile device 204*a*. Then, the proximity of the second mobile device 204*b* to the first mobile device 204*a* can be determine based on a distance between the location of the second mobile device 204*b* and the location of the first mobile device 204*a* also being less than the threshold distance 416.

At block 608, the computer-implemented process 600 involves, in response to authenticating the second user 207*b* and the second mobile device 204*b*, transmitting an application programming interface (API) call to the particular IoT service device 414. The API call can be transmitted by the computing environment 202 or by the terminal handler 201. Transmitting the API call can cause the particular IoT service device 414 to perform the at least one function 406 as indicated by the second request 222*b*. The second mobile device 204*b* may have transmitted the second request 222*b* on behalf of the first mobile device 204*a*. Therefore, the particular IoT service device 414 may perform the at least one function 406 with respect to a user account 210 associated with the first user 207*a*, the first mobile device 204*a*, or a combination thereof. The at least one function 406 can involve a secure transaction 418, such as a transfer of data, between the user account 210 and the particular IoT service device 414.

FIG. 7 is a flow chart of an additional alternative computer-implemented process 700 for facilitating secure transactions between IoT service devices and user accounts by a terminal handler 201 according to one example of the present disclosure. Operations of computer-implemented processes may be performed by software, firmware, hardware, or a combination thereof. The operations of the computer-implemented process 700 start at block 702. Other examples can include more steps, fewer steps, different steps, or a different order of the steps than is shown in FIG. 7. The steps of FIG. 7 are discussed below with reference to the components discussed above in relation to FIG. 3 and FIG. 4.

At block 702, the computer-implemented process 700 involves receiving a request 310 to perform at least one function 312*a*-*b* of a particular IoT service device 206. The request 310 can be received by the terminal handler 201 from a mobile device 304. The particular IoT service device 206 can be positioned in a location associated with the service provider. The request 310 can be a request for the IoT service device 206 to perform a first function 312*a*. For example, the IoT service device 206 can be an ATM that is in communication with the step-up authentication system 302 and the terminal handler 201 via the network 230 and the first function 312*a* can be for withdrawing funds from the user account 314. The request 310 can include an amount of funds to be withdrawn. The request 310 can also include first authentication credentials 322*a*, which may be associated with an online account 328, a user account 314, the IoT service device 206, or a combination thereof.

In some examples, the particular IoT service device 206 can be selected from a group of IoT service devices by the terminal handler 201 based on one or more real-time parameters 420 associated with the particular IoT service device 206. Examples of real-time parameters 420 associated with the particular IoT service device 206 can include availability, a current amount of resources, a position within the location associated with the server provider, a duration since a most recent maintenance check-up, etc. The terminal handler 201 can track and update values for real-time parameters 420 for each IoT service device in the group of IoT service devices. Subsequent to selecting the particular IoT service device 206, the terminal handler 201 can indicate to a user 340 of the mobile device 305 which IoT service device is the particular IoT service device 206. The indication can be made, for example, via a graphical element associated with a software application associated with the server provider.

At block 704, the computer-implemented process 700 involves determining that the request 310 satisfies at least one requirement 316 of a step-up authentication protocol 318. The terminal handler 201 can determine that the request 310 satisfies one or more requirements of a step-up authentication protocol 318. The terminal handler 201 can communicate the request 310 to the step-up authentication system 302. The step-up authentication protocol 318 can be a highly secure authentication process, in which the user 340 can be required to perform more than one authentication process. The step-up authentication protocol 318 can include requirements 316 or rules defining when to implement the step-up authentication protocol 318. The step-up authentication system 302 can further include a rules engine 332 for governing and determining the requirements 316. In some examples, the step-up authentication system 302 and the rules engine 332 can be components of the terminal handler 201.

For example, the rules engine 332 can include a first rule involving a first threshold 334*a*. The first threshold 334*a* can be a confidence score threshold, and the first rule can state that if a confidence score for a request is less than the first threshold 334*a*, then the step-up authentication protocol 318 should be executed. Therefore, in some examples, the step-up authentication system 302 may determine a confidence score 336 for the request 310 based on the first function 312*a*, the first authentication credentials 322*a*, other suitable information included in the request 310 (e.g., an amount of funds to be withdrawn), account details of the user account 314 or the online account 328, or a combination thereof. The step-up authentication system 302 may determine a lower confidence score for a request associated with a user account 314 or online account 328 to which recent changes were made (e.g., a change to authentication credentials for logging into the user account 314 or the online account 328). Additionally, the step-up authentication system 302 can determine a lower confidence score if the mobile device 304 that transmitted the request 310 is currently unregistered with the user account 314 or the online account 328.

Additionally, the rules engine 332 may generate different thresholds based on the functions 312*a-b*. For example, a second function 312*b* can be associated with transferring funds between the user account 314 and a secondary account associated with the service provider and belonging to the user 340. For example, the secondary account may be a savings account. Therefore, a confidence threshold associated with the second function 312*b* may be lower than the first threshold 334*a*.

Additionally or alternatively, the rules engine 332 can include a second rule involving a second threshold 334*b*. The second threshold 334*b* can be a function parameter threshold. For example, the request 310 can include a function parameter 308. For the first function 312*a*, the function parameter can be an amount of funds to be withdrawn. Therefore, the second rule may state that if the amount of funds for the first function 312*a* exceeds the second threshold 334*b*, the step-up authentication protocol 318 should be executed.

At block 706, the computer-implemented process 700 involves transmitting an authentication request 320 for second authentication credentials 322*b* to the mobile device 304. The second authentication credentials 322*b* can be a one-time passcode (OTP), a fingerprint or face identification, a second username and second password, or another suitable type of authentication credential. The mobile device 304 can receive the authentication request 320 as, for example, a push notification.

At block 708, the computer-implemented process involves receiving the second authentication credentials 322*b*. The second authentication credentials 322*b* can be transmitted by the mobile device 304 and received by the terminal handler 201. For example, the user 340 may select the push notification and provide the second authentication credentials 322*b* via a second authentication process performed using the mobile device 304.

At block 710, the computer-implemented process 700 involves authenticate a user 340 of the mobile device 304 based on the first authentication credentials 322*a* and the second authentication credentials 324*b*. For example, the terminal handler 201 may verify that the first authentication process and the second authentication process were successful (i.e., verify that the first authentication credentials 322*a* and the second authentication credentials 322*b* are valid for authenticating the user account 314 or the online account 328).

Additionally, to authenticate the mobile device 304, the terminal handler 201 can determine that the mobile device 304 is proximate to the IoT service device 206. For example, the terminal handler 201 may detect a location of the mobile device 304, such as by accessing location services of the mobile device 304. Then, the terminal handler 201 may inform the step-up authentication system 302 of a determined distance between the location of the mobile device 304 and a location of the IoT service device 206. The location of the IoT service device 206 may be a secure location controlled by or otherwise associated with the service provider. The step-up authentication system 302 may further determine that the distance is less than a threshold distance to authenticate the mobile device 304.

At block 712, the computer-implemented process 700 involves transmitting an API call 326 to the particular IoT service device 206 to cause the particular IoT service device 206 to perform the at least one function 312*a-b*. The API call 326 can be transmitted by the terminal handler 201. The at least one function 312*a-b* can involve a secure transaction 324 between the IoT service device 206 and the user account 214.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a terminal handler of a computing environment, the terminal handler communicatively coupled to a plurality of Internet of Things (IoT) service devices positioned in a location associated with a service provider, the terminal handler configured to control a particular IoT service device of the plurality of IoT service devices by performing operations comprising:
   receiving, from a mobile device, a request to perform a function of the particular IoT service device, the function of the particular IoT service device comprising withdrawal of a resource, and the request including an amount of the resource and authentication credentials associated with the service provider;
in response to receiving the request:
   selecting the particular IoT service device from the plurality of IoT service devices based on the particular IoT service device being available for performing the function and having at least the amount of the resource;
   authenticating a user of the mobile device based on the authentication credentials;
   authenticating the mobile device based on a distance between a location of the mobile device and the location associated with the service provider being less than a threshold distance;
   identifying a user account by:
      accessing a database comprising a mapping that relates each mobile device of a plurality of mobile devices to a user account of a plurality of user accounts based on each of the plurality of mobile devices being registered to the user account of the plurality of user accounts; and determining, based on the mapping, that the user account is registered to the mobile device; and in response to selecting the particular IoT service device, identifying the user account, and authenticating the user and the mobile device, transmitting an application programming interface (API) call to the particular IoT service device to cause the particular IoT service device to perform the function, wherein the function involves a withdrawal of the amount of the resource from the user account via the particular IoT service device.

2. The system of claim 1, wherein the request is a first request, the authentication credentials are first authentication credentials, the user is a first user, and the mobile device is a first mobile device, and wherein the operations further comprise:

receiving, from a second mobile device, a second request to perform the function, the second mobile device being an authorized device associated with the service provider, and the second request including second authentication credentials for authorized personnel associated with the service provider;

authenticating a second user of the second mobile device based on the second authentication credentials;

authenticating the second mobile device based on the second mobile device being the authorized device associated with the service provider; and in response to authenticating the second user and the second mobile device, transmitting the API call to the particular IoT service device to cause the particular IoT service device to perform the function.

3. The system of claim 2, wherein the particular IoT service device includes a near-field communication (NFC) token.

4. The system of claim 3, wherein the operations further comprise receiving, from the first mobile device, the first request by detecting a first tap gesture between the first mobile device and the NFC token, and wherein the terminal handler receives, from the second mobile device, the second request by detecting a second tap gesture between the second mobile device and the NFC token.

5. The system of claim 4, wherein the operations further comprise authenticating the first mobile device by determining, based on the first tap gesture, that the distance is less than the threshold distance.

6. The system of claim 1, wherein the operation of selecting the particular IoT service device from the plurality of IoT service devices further comprises selecting the particular IoT service device based on a length of time since a maintenance check-up of the particular IoT service device.

7. The system of claim 1, wherein the operations further comprise:

determining that the request satisfies a step-up authentication protocol based on the amount of the resource exceeding a resource threshold; and subsequent to determining that the request satisfies the step-up authentication protocol, transmitting an authentication request for second authentication credentials to the mobile device.

8. The system of claim 7, wherein the authentication credentials are first authentication credentials, and wherein the operation of authenticating, by the terminal handler, the user of the mobile device further comprises determining that the first authentication credentials and the second authentication credentials are valid for authenticating with the user account.

9. A computer-implemented method comprising:

receiving, from a mobile device, a request to perform a function of a particular IoT service device of a plurality of Internet of Things (IoT) service devices positioned in a location associated with a service provider, the function of the particular IoT service device comprising withdrawal of a resource, and the request including an indication of an amount of the resource and authentication credentials associated with the service provider;

in response to receiving the request:

selecting the particular IoT service device from the plurality of IoT service devices based on the particular IoT service device being available for performing the function and having at least the amount of the resource;

authenticating, by a terminal handler, a user of the mobile device based on the authentication credentials;

authenticating, by the terminal handler, the mobile device based on a distance between a location of the mobile device and the location associated with the service provider being less than a threshold distance;

identifying a user account by:

accessing a database comprising a mapping that relates each mobile device of a plurality of mobile devices to a user account of a plurality of user accounts based on each of the plurality of mobile devices being registered to the user account of the plurality of user accounts; and determining, based on the mapping, that the user account is registered to the mobile device; and in response to selecting the particular IoT service device, identifying the user account, and authenticating the user and the mobile device, transmitting an application programming interface (API) call from the terminal handler to the particular IoT service device to cause the particular IoT service device to perform the function, wherein the function involves a withdrawal of the amount of the resource from the user account via the particular IoT service device.

10. The computer-implemented method of claim 9, wherein the request is a first request, the authentication credentials are first authentication credentials, the user is a first user, and the mobile device is a first mobile device, the computer-implemented method further comprising:

receiving, from a second mobile device, a second request to perform the function, the second mobile device being an authorized device associated with the service provider, and the second request including second authentication credentials for authorized personnel associated with the service provider;

authenticating, by the terminal handler, a second user of the second mobile device based on the second authentication credentials;

authenticating, by the terminal handler, the second mobile device based on the second mobile device being the authorized device associated with the service provider; and in response to authenticating the second user and the second mobile device, transmitting the API call from the terminal handler to the particular IoT service device to cause the particular IoT service device to perform the function.

11. The computer-implemented method of claim 10, wherein the particular IoT service device includes a near-field communication (NFC) token.

12. The computer-implemented method of claim 11, further comprising receiving, from the first mobile device, the first request by detecting a first tap gesture between the first mobile device and the NFC token, and wherein the terminal handler receives, from the second mobile device, the second request by detecting a second tap gesture between the second mobile device and the NFC token.

13. The computer-implemented method of claim 12, further comprising authenticating the first mobile device by determining, based on the first tap gesture, that the distance is less than the threshold distance.

14. A non-transitory computer-readable medium comprising instructions that are executable by a processing device for causing the processing device to perform operations comprising:

receiving, from a mobile device, a request to perform a function of a particular IoT service device of a plurality of Internet of Things (IoT) service devices positioned in a location associated with a service provider, the function of the particular IoT service device comprising withdrawal of a resource, and the request including an indication of an amount of the resource and authentication credentials associated with the service provider;

in response to receiving the request:

selecting the particular IoT service device from the plurality of IoT service devices based on the particular IoT service device being available for performing the function and having at least the amount of the resource;

authenticating, by a terminal handler, a user of the mobile device based on the authentication credentials;

authenticating, by the terminal handler, the mobile device based on a distance between a location of the mobile device and the location associated with the service provider being less than a threshold distance;

identifying a user account by:

accessing a database comprising a mapping that relates each mobile device of a plurality of mobile devices to a user account of a plurality of user accounts based on each of the plurality of mobile devices being registered to the user account of the plurality of user accounts; and determining, based on the mapping, that the user account is registered to the mobile device; and in response to selecting the particular IoT service device, identifying the user account, and authenticating the user and the mobile device, transmitting an application programming interface (API) call from the terminal handler to the particular IoT service device to cause the particular IoT service device to perform the function, wherein the function involves a withdrawal of the amount of the resource from the user account via the particular IoT service device.

15. The non-transitory computer-readable medium of claim 14, wherein the request is a first request, the authentication credentials are first authentication credentials, the user is a first user, and the mobile device is a first mobile device, and wherein the operations further comprise:

receiving, from a second mobile device, a second request to perform the function, the second mobile device being an authorized device associated with the service provider, and the second request including second authentication credentials for authorized personnel associated with the service provider;

authenticating a second user of the second mobile device based on the second authentication credentials;

authenticating the second mobile device based on the second mobile device being the authorized device associated with the service provider; and in response to authenticating the second user and the second mobile device, transmitting the API call to the particular IoT service device to cause the particular IoT service device to perform the function.

* * * * *